(12) United States Patent
Balduccini et al.

(10) Patent No.: US 11,836,198 B2
(45) Date of Patent: Dec. 5, 2023

(54) ACTION-CENTERED INFORMATION RETRIEVAL

(71) Applicant: Drexel University, Philadelphia, PA (US)

(72) Inventors: Marcello Balduccini, Wynnewood, PA (US); Emily LeBlanc, Bala Cynwyd, PA (US)

(73) Assignee: Drexel University, Philadelphia, PA (US)

( * ) Notice: Subject to any disclaimer, the term of this patent is extended or adjusted under 35 U.S.C. 154(b) by 397 days.

(21) Appl. No.: 16/121,674

(22) Filed: Sep. 5, 2018

(65) Prior Publication Data
US 2019/0073426 A1 Mar. 7, 2019

Related U.S. Application Data

(60) Provisional application No. 62/554,042, filed on Sep. 5, 2017.

(51) Int. Cl.
*G06F 16/9535* (2019.01)
*G06F 16/2457* (2019.01)

(52) U.S. Cl.
CPC .... *G06F 16/9535* (2019.01); *G06F 16/24578* (2019.01)

(58) Field of Classification Search
CPC .......... G06F 16/9535; G06F 16/24578; G06F 16/24522; G06F 16/3329; G06F 16/3338; G06F 16/3344; G06F 16/3346; G06N 5/00; G06N 5/04
See application file for complete search history.

(56) References Cited

U.S. PATENT DOCUMENTS

| | | | | |
|---|---|---|---|---|
| 6,269,368 B1* | 7/2001 | Diamond | ............ | G06F 16/3329 |
| 8,065,319 B2* | 11/2011 | Ding | ....................... | G06Q 10/06 |
| | | | | 707/769 |
| 9,256,667 B2* | 2/2016 | Koudas | ................. | G06F 16/338 |

(Continued)

OTHER PUBLICATIONS

Li, Wenbin, "Consistency Checking of Natural Language Temporal Requirements using Answer-Set Programming" (2015). Theses and Dissertations—Computer Science. 34. https://uknowledge.uky.edu/cs_etds/34, pp. 1-153 (Year: 2015).*

(Continued)

*Primary Examiner* — Robert W Beausoliel, Jr.
*Assistant Examiner* — Cheryl M Shechtman
(74) *Attorney, Agent, or Firm* — Schott, P.C.

(57) ABSTRACT

The system uses natural language to paths of a transition diagram via answer set programming system and provides: an approach for mapping events described in natural language sources to a logical formalism; and integration of Natural Language Processing and constraint-based reasoning inspired by Reasoning about Actions and Change. The system further uses (a) a non-trivial variant of IR in which sources include sequences of events, and queries are made about the state of the world after such events; (b) the extension of techniques for representing dynamic domains to increase the flexibility of the reasoning processes in the presence of uncertainty; (c) a formalization of the IR task based on action languages; (d) an automated IR procedure based on Answer Set Programming (ASP).

16 Claims, 2 Drawing Sheets

(56) References Cited

U.S. PATENT DOCUMENTS

| | | | | |
|---|---|---|---|---|
| 2009/0327115 | A1* | 12/2009 | Schilder | G06F 16/36 705/35 |
| 2012/0036130 | A1* | 2/2012 | Light | G06F 40/30 707/769 |
| 2015/0039648 | A1* | 2/2015 | Mukherjee | G06F 16/24568 707/769 |
| 2016/0125041 | A1* | 5/2016 | Smith | G06F 16/9535 707/770 |
| 2016/0140128 | A1* | 5/2016 | Swan | G06F 16/2477 707/725 |
| 2016/0350306 | A1* | 12/2016 | Hurley | G06F 16/248 |
| 2017/0329653 | A9* | 11/2017 | Li | G06F 16/9535 |
| 2018/0081627 | A1* | 3/2018 | Bajekal | G06F 16/489 |
| 2018/0129744 | A1* | 5/2018 | George | H04L 67/02 |

OTHER PUBLICATIONS

Baier, T et al, Matching events and activities by integrating behavioral aspects and label analysis, Softw Syst Model 17, 573-598, https://doi.org/10.1007/s10270-017-0603-z (Year: 2017).*

Giordano, L et al, Reasoning about actions with Temporal Answer Sets, 2013, Theory and Practice of Logic Programming, 13(2), 201-225 (Year: 2013).*

Dongcai Lu, Integrating Answer Set programming with semantic dictionaries for robot task planning, 2017, Proceedings of the Twenty-Sixth International Joint Conference on Artificial Intelligence, pp. 4361-4367 (Year: 2017).*

Dominique Cansell et al, Tutorial on the event-based B method. IFIP FORTE 2006 Paris, 2006 (Year: 2006).*

Carsten Kebler et al, "Context-aware semantics-based information retrieval.," The Free Library, 2011 Book News, Inc, retrieved Oct. 17, 2022, pp. 1-129, https://www.thefreelibrary.com/Context-aware+semantics-based+information+retrieval.-a0276434955 (Year: 2011).*

"Potassco, the Potsdam Answer Set Solving Collection, bundles tools for Answer Set Programming developed at the University of Potsdam," Potassco, accessed http://potassco.sourceforge.net/, accessed on Jan. 19, 2019, pp. 2.

"Software for complex networks," NetworkX, accessed at http://networkx.github.io/, accessed on Jan. 19, 2019, p. 1.

"Stanford CoreNLP—Natural language software," CoreNLP, version 3.9.2, accessed at http://stanfordnlp.github.io/CoreNLP/, accessed on Jan. 19, 2019, pp. 5.

"Welcome To the Association for the Advancement of Artificial Intelligence!," accessed at www.aaai.org, accessed on Jan. 22, 2019, pp. 7.

Allen, J.F., "Maintaining knowledge about temporal intervals," Communications of the ACM, vol. 26, No. 11, pp. 832-843 (1983).

Balduccini, M., and Gelfond, M., "Diagnostic reasoning with A-Prolog," Journal of Theory and Practice of logic Programming (TPLP), vol. 3, No. 4-5, pp. 425-461 (Jul. 2003).

Balduccini, M., et al., "Handbook of Knowledge Representation, Knowledge Representation and Question Answering," Handbook of Knowledge Representation, chapter 20, Foundations of Artificial Intelligence, pp. 41 (2007).

Baral, C., and Gelfond, M., "Reasoning Agents In Dynamic Domains," In Workshop on Logic-Based Artificial Intelligence, pp. 257-279 (2000).

Baral, C., et al., "The nl2kr system," 1st Workshop on Natural Language Processing and Automated Reasoning (NLPAR), vol. 1044, No. 11, pp. 37-47 (2013).

Baral, C., et al., 2004. International Conference on Logic Programming and Nomnonotonic Reasoning, Berlin: Springer.

Blanco, R., and Lioma, C., "Graph-based term weighting for information retrieval," Information retrieval, vol. 15, No. 1, pp. 54-92 (2012).

Campos, R., "Survey of temporal information retrieval and related applications," ACM Computing Surveys (CSUR), vol. 47, No. 2, pp. 41 (2015).

Carpineto, C., and Ramano, G., "A Survey of Automatic Query Expansion in Information Retrieval," ACM Compllling Surveys (CSUR), vol. 44, No. 1, Article 1, pp. 1-50 (2012).

Galescu, L., and Blaylock, N., "A corpus of clinical narratives annotated with temporal information," In Proceedings of the 2nd ACM SIGH IT International Health Informatics Symposium, pp. 715-720 (2012).

Gartner, T., et al., "On Graph Kernels: Hardness Results and Efficient Alternatives," In Procs of the 16th Annual Conference on Learning Theory and 7th Kernel Worksltop, COLT/Kernel 2003, pp. 129-143 (2003).

Gelfond, M., and Kahl, Y., "Knowledge Representation, Reasoning, and the Design of Intelligent Agents," The Answer-Set Programming Approach, Cambridge University Press, pp. 14 (2014).

Gelfond, M., and Lifschitz, V., "Classical Negation in Logic Programs and Disjunctive Databases," New Generation Computing, vol. 9, No. 3, pp. 365-385 (1991).

Gelfond, M., and Lifschitz, V., "Representing Action and Change by Logic Programs," The Journal of Logic Programming, vol. 17, No. 2-4, pp. 301-321 (1993).

Gelfond, M., and Lifschitz, V., "The stable model semantics for logic programming," In Proceedings of ICLP-88, pp. 1070-1080 (1988).

Glavas, G., and Snajder, J., "Event Graphs for Information Retrieval and Multi-Document Summarization," Expert Systems with Applications, vol. 41, Issue 15, pp. 6904-6916 (2014).

Glavas', G., and Snajder, J., "Event-centered information retrieval using kernels on event graphs," TextGraphs-at Empirical Methods in Natural Language Processing EMNLP', pp. 1-5 (2013).

Hayes, P. J., and Mccarthy, J., "Some Philosophical Problems from the Standpoint of Artificial Intelligence," In B. Meltzer & Donald Michie (eds.), Machine Intelligence 4. Edinburgh University Press. pp. 463-502 (1969).

Inclezan, D., "A clib-inspired library of commonsense knowledge in modular action language alm," In: Proceedings of the AAAI 2015 Spring Symposium on Formalizing Commonsense , pp. 7 (2015).

Inclezan, D., "An ALM Library Translated from the Component Library," In 32nd International Conference on logic Programming (ICLP16), pp. 15 (2016).

Leblanc, E., and Balduccini, M., "Interpreting: Natural Language Sources Using Transition Diagrams," In Christiansen, H., and Dahl, V., eds., logic Programming wilh Consrraims for language Processing (CSLP2016).

Manning, C., et al., "Introduction to information retrieval," vol. 1, Cambridge University, pp. 581 (2008).

Matuszek, C., et al., "An introduction to the syntax and content of cyc," In AAAI Spring Symposium: Formalizing and Compiling Back- ground Knowledge and Its Applications to Knowledge Representation and Question Answering, pp. 44-49 (2006).

Mccarthy, J., and Hayes, P. J., "Some philosophical problems from the standpoint of artificial intelligence," Readings in artificial intelligence, pp. 431-450 (1969).

Minard, A., "In Semeval-2015 task 4: Timeline: Cross-document event ordering," Proceedings of the 9th International Workshop on Semantic Evaluation (SemEval 2015), pp. 778-786 (2015).

Morales, R.; et al., "An Extension to Conformant Planning Using Logic Programming," In Veloso, M. M., ed., Proceedings of the Twentieth International Joint Conference on Artificial Intelligence (IJCAI'07), pp. 1991-1996 (2007).

Nguyen, V., et al., "The NL2KR Platform for Building Natural Language Translation Systems," In 53rd Annual Meeting of The Association for Computational Linguistics, pp. 899-908 (2015).

Page, L., et al., "The pagerank citation ranking: bringing order to the web," Technical Report, Stanford InfoLab, pp. 17 (1999).

Suchanek, F.M., et al., "Yago: A large ontology from wikipedia and wordnet," Web Semantics: Science, Services and Agents on the World Wide Web archive, vol. 6, No. 3, pp. 203-217 (2008).

Uzzaman, N., "Tempeval-3: Evaluating events, time expressions, and temporal relations," Preprint, arXiv:1206.5333, pp. 1-6 (2012).

Vishwanathan, S., et al., "Graph Kernels," Journal of Machine Learning Research, vol. 11, pp. 1201-1242 (2010).

* cited by examiner

```
Algorithm: FindMatch(I,ℵ,Q)
Input: I – (set) fluent literals explicitly stated to hold in the initial state by S; ℵ = ⟨a₀,a₁,...,aₖ⟩ –
sequence of actions from S; Q – fluent.
Output: an answer set encoding a path if a match exists; ⊥ otherwise.
  1. Let R be the intersection of all answer sets of Π_AD(I, F \ D, ℵˣ) and I' be I ∪
     {l | {χ(l,0), forced(f)} ⊆ R ∧ (l = f ∨ l = ¬f)}.
  2. If Π_AD(I, F \ D, ℵˣ) has no answer set, return ⊥ and terminate.
  3. Initialize F := ∅ and s := ℵˣ.
  4. For every answer set A of Π_AD(I', F, s) such that {χ(Q,k+1), χ(¬Q,k+1)} ∩ A ≠ ∅:
     (a) Let X = {f | holds(f,0) ∈ A ∧ f ∉ I'} ∪ {¬f | ¬holds(f,0) ∈ A ∧ ¬f ∉ I'}.
     (b) For every answer set B of Π_AD(X, ∅, ⟨⟩), check that {χ(Q,0), χ(¬Q,0)} ∩ B = ∅, or
         χ(Q,0) ∈ B ∧ χ(¬Q,k+1) ∈ A, or χ(¬Q,0) ∈ B ∧ χ(Q,k+1) ∈ A.
     (c) If every B satisfies the condition, then return A and terminate.
  5. Select a set F' of fluents and an extension s' of ℵ such that:
     (a) the pair F', s' has not yet been considered by the algorithm, and
     (b) |F'| + |s'| is minimal among such pairs.
  6. If no such pair F', s' exists, then return ⊥ and terminate.
  7. F := F'; s := s'. Repeat from step 4.
```

FIG. 2

ACTION-CENTERED INFORMATION RETRIEVAL

BACKGROUND

Information Retrieval

Information Retrieval (IR) is concerned with retrieving documents that are most likely to fulfill the information need represented by queries. In the traditional IR approach to representing sources, the texts are broken down into lists of keywords, terms, and other content descriptors. When presented with a query, an IR system typically determines the relevance of a document to the query by measuring the overlap of terms between the query and a particular source.

A number of mature approaches have been developed to improve search results using techniques such as temporal ordering, query expansion, and graph based term weighting, however, these approaches may fail to capture the deeper semantic meaning of the source as the representations are constructed using syntactic methods. Work in event-centered IR has focused on modeling the content of sources as a graph composed of event mentions from natural language sources and their temporal relationships; however, the approach does not consider the evolution of the state of the world in correspondence to these actions.

Answer Set Programming (ASP) and Reasoning about Actions and Change (RAC)

ASP is a form of declarative programming that is useful in knowledge-intensive applications. Search problems in ASP are reduced to computing answer sets of logic programs. As such, ASP is well-suited to the task of leveraging both event mentions and domain knowledge to automatically obtain a detailed picture of the scenario. RAC is concerned with representing the properties of actions. With respect to ASP, the approach involves temporal reasoning in situations where some facts are given and we wish to infer additional facts based on the information that we have.

SUMMARY OF THE EMBODIMENTS

The system discussed herein addresses this gap and overcomes the shortcomings of syntactic-based methods. The natural language to paths of a transition diagram via answer set programming system may provide:
- an approach for mapping events described in natural language sources to a logical formalism;
- integration of Natural Language Processing and constraint-based reasoning inspired by Reasoning about Actions and Change.

The system further uses (a) a non-trivial variant of IR in which sources include sequences of events, and queries are made about the state of the world after such events; (b) the extension of techniques for representing dynamic domains to increase the flexibility of the reasoning processes in the presence of uncertainty; (c) a formalization of the IR task based on action languages; (d) an automated IR procedure based on Answer Set Programming (ASP).

BRIEF DESCRIPTION OF THE DRAWINGS

FIG. 2 shows the FindMatch algorithm.

DETAILED DESCRIPTION OF THE EMBODIMENTS

Figure 1:
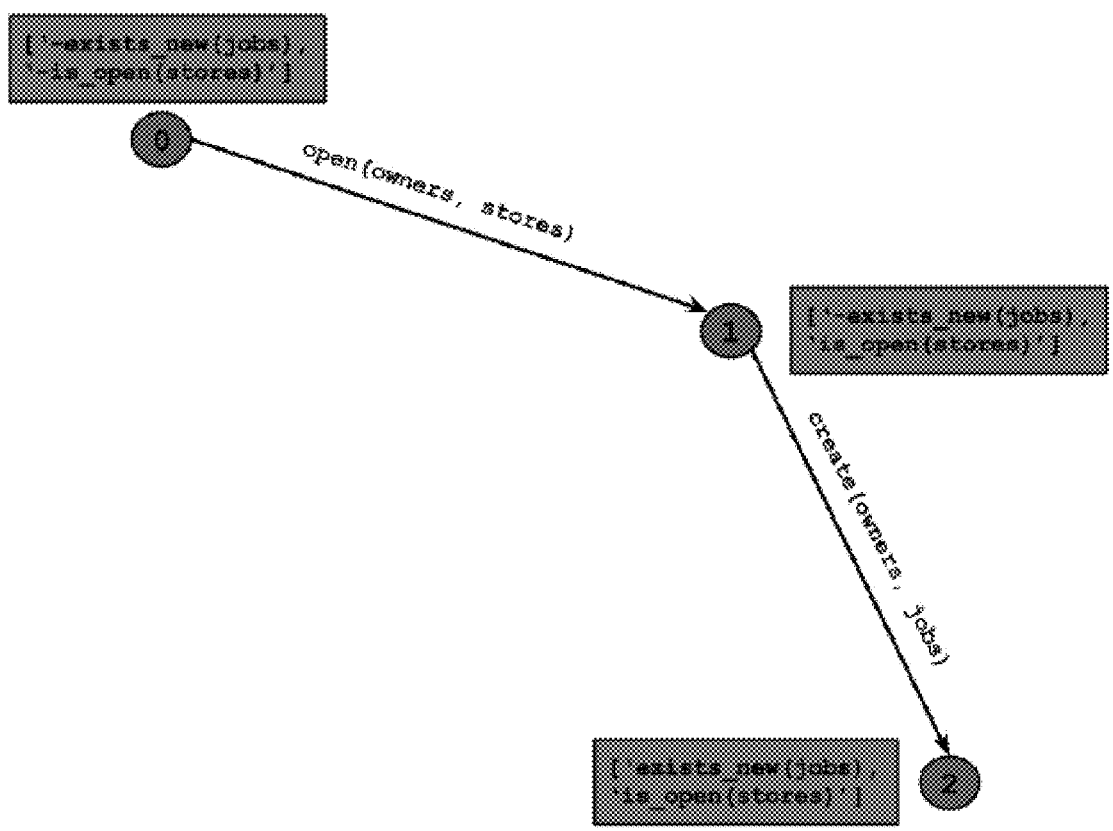
FIG. 1 shows a path for the sentence "Store owners created jobs after they opened new stores."

1. Natural Language to Paths of a Transition Diagram Via Answer Set Programming Natural language understanding is often used in modern Information Retrieval and Question Answering research. Advancement in these fields may rely in part upon translating information described in natural language sources into models that are well suited to addressing particular information needs. The system(s) described herein describe an approach for interpreting natural language descriptions of one or more events occurring in a given domain and their effects on the state of the world through construction of corresponding models that facilitate reasoning for information about events occurring in a particular domain. This system interprets natural language passages that talk about a sequence of events. In addition to retaining the sequence, the system may employ an understanding of the context in which the events have occurred to form a picture of how the state of the world may have changed as a result In this way, it gains a deeper understanding of the meaning of the events, and can make use of that knowledge in response to a query.

The system may function using knowledge gained by interpreting natural language sources describing sequences of events by leveraging natural language processing techniques and constraint-based reasoning over existing domain knowledge via Answer Set Programming (ASP). The system may assume that domain knowledge exists as constraints using Answer Set Programming. These constraints may embody a transition diagram describing all possible world states of the domain and the actions that trigger transitions between them. The discussion herein assumes the existence of knowledge in this form.

Given a natural language source describing a sequence of actions, one task is to map that sequence and corresponding state information, via inference, to one or more paths in the transition diagram. Information Retrieval systems may use this approach for document preprocessing such that they can reason over the resulting models when faced with information needs related to understanding events and their effects on the domain in which they have occurred. Moreover, this preprocessing may be leveraged by Question Answering systems to identify more promising sets of documents from which to extract answers.

1.1. Preliminaries

1.1.1. Syntax and Semantics of ASP

Let $\Sigma$ be a signature containing constant, function, and predicate symbols. Terms and atoms are formed as in first-order logic. A literal is an atom a or its strong negation a. Literals are combined to form rules that represent both domain knowledge and event mentions in our approach. A rule in ASP is a statement of the form:

$$h_1, \vee \ldots \vee, h_k \leftarrow l_1, \ldots, l_m, \text{not } l_{m+1}, \ldots, \text{not } l_n \qquad \text{EQ. 1,}$$

where $h_i$'s (the head) and $l_i$'s (the body) are literals and not is the so-called default negation. Intuitively, the meaning of default negation is the following: "if you believe $\{l_1, \ldots, l_m\}$ and have no reason to believe $\{l_{m+1}, \ldots, l_n\}$, then you must believe at least one of $h_i$'s". An ASP rule with an empty body is called a fact, and that in writing facts, the ← connective is dropped.

Rules of the form $\perp \leftarrow l_1, \ldots,$ not $l_n$ are abbreviated $\leftarrow l_1, \ldots,$ not $l_n$, and called constraints, intuitively meaning $\{l_1, \ldots,$ not $l_n\}$ must not be satisfied. A rule with variables (denoted by an uppercase initial) is interpreted as a shorthand for the set of rules obtained by replacing the variables with all possible variable-free terms.

A program is a set of rules over $\Sigma$. A consistent set S of domain literals is closed under a rule if $\{h_1, \ldots, h_k\} \cap \neq 0$; whenever $\{l_1, \ldots, l_m\} \subseteq S$ and $\{l_{m+1}, \ldots, l_n\} \cap S=0$. Set S is an answer set of a not-free program $\Pi$ w.r.t. S is the minimal set closed under its rules. The reduct, $\Pi^s$, of a program $\Pi$ w.r.t. S is obtained from $\Pi$ by removing every rule containing an expression "not 1" s.t 1 $\in$S and by removing every other occurrence of not 1.

1.2.2 Domain Description

For the formalization of all possible evolutions of the domain over time, the system may employ techniques from RAC. This formalization is called a domain description and represents our domain knowledge. A domain description is a collection of ASP rules encoding the direct and indirect effects of actions that occur in the domain.

Fluents are first-order terms denoting properties of interest in a domain whose truth value may change over time. For example, opened $(s_1, y_1)$ may represent the fact that store $s_1$ was opened in the year $y_2$. A fluent literal is a fluent f or its negation $\neg$f.

A set A of fluent literals is consistent if $\forall f, \{f, \neg f\} \subseteq A$ and complete if $\forall f, \{f, \neg f\} \cap A \neq 0$. The fact that a fluent f holds at a step i in the evolution of the domain is represented by the ASP atom holds (f, i). Similarly, if f does not hold at step i, we write $\neg$holds(f, i). Actions are represented by first-order terms as well. The occurrence of an action a at step i is represented by an ASP atom occurs (a, i).

The three types of ASP rules used to represent domain descriptions are discussed next In the following, S is a variable ranging over all possible steps in the evolution of the domain. Given a fluent literal l, the abbreviation X (l, S) stands for holds (f, S) if l=f, and $\neg$holds (f, S) if l=$\neg$f. A dynamic (causal) law is a statement of the form:

$$\chi(l_0, S+1) \leftarrow \chi(l_1, S), \ldots, \chi(l_n, S), \text{occurs } (a, S) \qquad \text{EQ. 2,}$$

where a is an action and $l_i$'s are fluent literals. The statement intuitively means that if a is executed in a state in which $l_1, \ldots, l_n$ hold, it causes $l_0$ to hold in the resulting state.

A state constraint is a statement of the form:

$$\chi(l_0, S) \leftarrow \chi(l_1, S), \ldots, \chi(l_n, |S). \qquad \text{EQ. 3,}$$

where $l_i$'s are fluent literals. The statement says that $l_0$ holds whenever $l_1, \ldots, l_n$ hold.

An executability condition is a statement of the form:

$$\leftarrow \chi(l_1, S), \ldots, \chi(l_n, S) \text{ occurs } (a, S) \qquad \text{EQ. 4,}$$

where a and $l_i$'s are as above. The statement says that action a cannot be executed if $l_1, \ldots, l_n$ hold.

The domain description also contains rules that capture the principle of inertia, which states that things generally stay as they are. That is to say that if a fluent is true (or not true) at the current time step, and there is no reason to believe that the fluent's truth value has changed at the next time step, then we continue to believe that the fluent is true (resp. not true) in the next time step.

$$\text{holds}(F, S+1) \leftarrow \text{fluent}(F), \text{holds}(F,S), \text{not } \neg\text{holds}(F, S+1).$$

$$\neg\text{holds}(F,S+1) \leftarrow \text{fluent}(F), \neg\text{holds}(F,S), \text{not holds}(F, S+1). \qquad \text{EQs. 5, 6}$$

The next rule is called the "awareness axiom" and ensures that a reasoner considers both possible cases of any fluent whose initial truth value is unknown.

$$\text{holds}(F,0) \lor \neg\text{holds}(F,0) \leftarrow \text{fluent}(F) \qquad \text{EQ.7.}$$

Note that if complete knowledge about the initial state is available in the problem instance, then the awareness axiom is rendered inapplicable. Both the inertia rules and the awareness axiom represent simple yet powerful commonsense knowledge that that makes it possible to reason about complex effects of actions on fluent literals of the domain.

A set A of fluent literals is closed under a state constraint if either $l_1, \ldots, l_n 1 \not\subseteq A$ or $l_0 \in A$. A state of a domain description D is a complete and consistent set of fluent literals closed under the state constraints of D. Given state $\sigma$, $h(\sigma; i)$ denotes $\{\text{holds}(f, i)|f \in \sigma\} \cup \{\neg \text{holds } (f, i)|\neg f \in \sigma\}$. Action a is executable in state $\sigma$ iff $D \cup h(\sigma, 0) \cup \{\text{occurs } (a, 0)\}$ has at least one answer set.

The set of the possible evolutions of D is represented by a transition diagram, i.e., a directed graph $\tau(D)$=<N, E> such that:

1. N is the collection of all states of D;
2. E is the set of all triples <$\sigma$, a, $\sigma'$> where $\sigma$, $\sigma'$ are states, a is an action (or event) that is executable in $\sigma$, and $D \cup h(\sigma, 0) \cup \{\text{occurs } (a, 0)\}$ has an answer set, A, such that $h(\sigma', 1) \subseteq A$.

A sequence <$\sigma_0, \alpha_0, \sigma_1, \ldots, \alpha_{k-1}, \sigma_k$> is a path of $\tau(D)$ if every <$\sigma_i, \alpha_i, \sigma_{i+1}$> is a valid transition in the graph.

1.3. Mapping Natural Language to Paths of a Transition Diagram

Our approach to interpreting a source is composed of two high-level steps: Processing a natural language source, and reasoning about state information in order to enable the construction of a path. In this section, we will follow the processing of a sample natural language source into to a path representing events and information about their effects on the state of the world. We will consider the following simple sentence to demonstrate the system approach:

"Store owners created jobs after they opened new stores."

Although multiple valid paths may be identified by the approach, for simplicity's sake we focus on the construction of a single path for this example.

1.4. Processing the Natural Language Source

The first step involves extracting mentions of actions from a natural language source. After collecting the actions, they are placed in a chronologically ordered list. Finally, we translate each action into a corresponding logical statement describing the occurrence of the event at its specific step. For example, if an action is at the first position in the list, we say that it occurs at time step 0.

1.4.1 Extracting Event Mentions

To extract event mentions from the sources, the system may use syntactic parsing to detect the events. The system parses the source text using the Stanford CoreNLP libraries3 which yields tokens, syntactic dependency information, coreference information, and other syntactic attributes of the input text. This information may be used to further interpret the natural language text.

From the syntactic parsing results, the system may extract two kinds of action tuples by linking dependencies across the sentence. The first is of the form action, subject/object and represents actions related to a subject or object, but not both (e.g. "stores opened" or "jobs were created"). The second is of form action, subject, object and represents actions performed by a subject with respect to some object (e.g. "Store owners created jobs." becomes created, owners, jobs ).

Once the system has extracted the action tuples, it uses the coreference information obtained from the parsing step for anaphora resolution if needed. Finally, all verbs are lemmatized to obtain the base forms. In the case of our running example, the system returns the tuples (create,owners,jobs) and (opened, owners, stores).

1.4.2 Ordering Event Mentions

The goal of the next step is to store the action predicates in a chronologically ordered list Consider a constrained natural language that adheres to a specific format for describing sequences of events. A current approach requires that the natural language sources contain a single sentence conforming to the following template:

$$e1(\text{temporal relation})e2 \qquad \text{EQ. 8,}$$

where e1 and e2 are mentions of actions and the temporal relation tag is one of the markers from Allen's interval calculus, specifically BEFORE and AFTER. This marker represents the temporal relationship of events e1 and e2. In our example, e1 intuitively maps to the statement that jobs were created by store owners, e2 corresponds to the statement that new stores were opened, and the temporal relation AFTER indicates that the four new stores opened prior to the creation of the new jobs. We use the results of the syntactic parsing and the value of the temporal relation in order to construct an ordered list of events. In our example, the source contains the word "after" which is interpreted to signify that opened, owners, stores, or e1 from our specification of source format, should appear in the list after create, owners, jobs, or e2. The system may incorporate existing temporal relationship extraction systems as modules that may lift the constraints placed on the format of the sources. The system may also include handling event descriptions in which no temporal relationship can be extracted.

1.4.3 Translating to ASP

The system may translate the event mentions to an equivalent ASP form using syntactic rules, however, work exists on translating natural language directly to ASP using more advanced techniques. NL2KR is a sophisticated system for such a translation up to the point of being able to learn meanings of words that it has not encountered before and may be used with the system to improve the natural language translation of events to ASP.

Our system first converts the predicate tuples into corresponding ASP form action (subject) or action (actor,target), and writes the ASP predicates into the problem instance. In our example, we have open (owners,stores) and create (owners,jobs). Finally, we assign occurrences of the actions to steps based on the ordering, and we encode the information by means of occurs (a, i) statements. For the example above, the corresponding facts are:

occurs(open(owners,stores),0).
occurs(create(owners,jobs),1).

1.5. Reasoning About State Information and Path Construction

The second step of the approach involves reasoning over the event mentions together with the domain and commonsense knowledge in order to identify paths in the transition diagram consistent with the sources and to determine the corresponding states of the world. As mentioned earlier, we assume the existence of commonsense and domain-specific knowledge.

Knowledge of actions and domain may be combined into a single ASP program over which a solver reasons for information about the state of the world. In our approach, the problem instance contains the ASP rules corresponding to action mentions and the problem encoding contains ASP rules corresponding to domain knowledge and common sense. Inference is applied to the ASP program in order to determine how the effects of the actions are propagated. The product of the reasoning process is a collection of facts about each step in the evolution of the domain. This information identifies one or more possible paths of the domain's transition diagram. More precisely, each answer set of the program represents a distinct path. The task of finding the corresponding paths in the transition diagram involves invoking an ASP solver, such as clingo4, to find the answer sets of the logic program. The rules of the domain description used next may be hand-encoded. The domain description in this example contains commonsense information about the effects of opening something and the effects of creating something. For example, knowledge of the act of opening a store is represented using the following two rules:

$$\text{fluent(is\_open(Y))} \leftarrow \text{occurs(open(X,Y),S)}.$$

$$\text{holds(is\_open(Y),S+1)} \leftarrow \text{occurs(open(X,Y),S)}. \qquad \text{EQs. 9, 10}$$

The first rule defines a fluent of the form is_open (Y, X) for every occurrence of an action open(X, Y) mentioned by the source 5. The second rule states that the effect of X opening Y is that Y is open. Knowledge of the creation of Y by X is similarly encoded by rules stating that, if X creates Y, then there exists new Y.

To reason about the effects of the actions from our example on the state of the world with respect to the domain description, the system may feed the problem instance and problem encoding to the clingo solver. Finally, the system parses the output of the solver and builds a path representing states of the world at each step of the example and edges representing events connecting them. The path may be constructed using the python NetworkX6 library. The results, shown in Table 1, which shows values of domain fluents before, during, and after example events, are quite intuitive once the stores have been opened, they remain open in all subsequent states thanks to the inertia axiom (and unless otherwise specified by other portions of the source).

TABLE 1

| Step | Action | is open(stores) | exists new(jobs) |
|---|---|---|---|
| 0 | open (owners, stores) | false | false |
| 1 | create (owners, jobs) | true | false |
| 2 | — | true | true |

Similarly, once the jobs are created, they remain in existence in subsequent states as we have no information stating that the jobs have been taken. The system additionally displays a graphical representation of the path(s), as shown in FIG. 1.

1.6. Use Cases

In this section, we present use cases to illustrate the depth of understanding that is achieved in the system. The first use case demonstrates the necessity of the awareness and inertia axioms to correctly assert what is true and what is not in each state along a path. The second illustrates an application in Question Answering.

1.6.1. Use Case 1: Google Acquires Motorola

Here we demonstrate how the system is capable of leveraging commonsensical axioms, such awareness and inertia, to process natural language sources that describe actions. We show that a detailed processing of an example from the literature requires the use of inertia and awareness. We will begin by processing a natural language source and a domain description that includes both axioms. Then we will observe the loss of quality of the representation when we remove awareness from the domain description, and then we will observe the further distortion when inertia is also removed. For this example, we would like to find a path that corresponds to the following sentence: "Google bought Motorola after the government approved the acquisition."

The domain description contains information about the effects of purchasing and approval. Knowledge of the act of purchasing is represented using the following two rules:
fluent(is owned by(Y,X))←occurs (buy (X,Y),S).
holds(is owned by(Y,X),S+1)←occurs(buy(X,Y),S).

The first rule defines a fluent of the form is_owned by (Y, X) for every occurrence of an action buy (X, Y) encountered in the source. The second rule states that the effect of X buying Y is that Y is_owned by X. Knowledge of X approving Y is similarly encoded by rules stating that, if X approves Y, then Y is allowed by X.

Given the above sentence and the domain description, our prototype maps the sentence to ASP statements as described in the previous section, invokes the clingo solver, and produces the state information shown in Table 2, which shows values of fluents in each state with awareness and inertia in the domain description, and describes actions and their effects at specific time steps along the path.

TABLE 2

| Step | Action | allows (acquisition, gov't) | is owned by (Motorola, Google) |
|---|---|---|---|
| 0 | approves (gov't, acquisition) | false | false |
| 1 | buy (Google, Motorola) | true | false |
| 2 | — | true | true |

At steps 1 and 2, the value of the fluent is owned by(Motorola, Google) is false, meaning that Google does not own Motorola. However, when the action buy(Google, Motorola) occurs at step 1, a transition occurs to step 2 in which Google does own Motorola, i.e. the value of is owned by(Motorola, Google) is true.

To highlight the importance of the awareness axiom, let us consider the effects of removing it from the domain description. Table 3 shows that there are no truth values for either of the domain fluents until after the occurrence of the events that define them.

TABLE 3

| Step | Action | allows (acquisition, gov't) | is owned by (Motorola, Google) |
|---|---|---|---|
| 0 | approves (gov't, acquisition) | — | — |
| 1 | buy (Google, Motorola) | true | — |
| 2 | — | true | true |

That is to say that the value of a fluent is not true or false unless explicitly expressed in the domain description or as a result of an action. The awareness axiom allows the system to make hypotheses about the values of each possible fluent in every state as we saw in Table 2.

When we additionally remove the inertia axiom from the domain description, the information that can be inferred about the states of the domain is further reduced. Specifically, Google owns Motorola in the state just after the purchasing action, but the system has no information about the ownership in any subsequent states as can be seen in Table 4.

TABLE 4

| Step | Action | allows (acquisition, gov't) | is owned by (Motorola, Google) |
|---|---|---|---|
| 0 | approves (gov't, acquisition) | — | — |
| 1 | buy (Google, Motorola) | true | — |
| 2 | — | — | true |

It is easy to see that both awareness and inertia are crucial to having accurate state information that reflects not only domain knowledge but human-like intuition about the state of the world when commonsense facts are not explicitly stated.

1.6.2. Use Case 2: John Sells All of His Possessions

In this example, we illustrate how the representation proposed in this approach may be used in conjunction with Question Answering techniques to enhance a QA system's ability to reason for answers that are not explicitly stated in the sources or the domain knowledge. Finding such an answer can involve a deeper understanding of both the domain and the scenario in question. Consider the following sentence: "John sold his most valuable possessions to Mary before he sold his least valuable possessions to Frank."

Assume that we have a domain description which contains facts about John. First, there are definitions of John's valuable and invaluable possessions. For example, John's house at 123 Lancaster Avenue is listed among his valuable property. Additional commonsense rules exist in the description regarding purchasing and ownership, similar to what we have demonstrated in previous examples.

Suppose that we would like to know the answer to the question "Who currently owns the house at 123 Lancaster Avenue?" Referring to the knowledge base alone, the system would incorrectly answer that John owns the house because it is listed among his valuable property. However, because we have processed the sentence about John selling his possessions, we now have an understanding of the effects of his sales on the state of the world. An end-to-end QA system would then be able to correctly infer that Mary now owns all of John's valuable possessions, and because there is no additional information stating that Mary has sold the house, the system could correctly answer that she is the current owner.

In this section, we discussed a system that takes a nontrivial approach that extends the state of the art of the event-based document representation by proposing a rich semantic encoding of events and the consequences of their occurrence on the state of the world.

2. Information Retrieval with Actions and Change: An ASP-Based Solution

In this section, we begin by analyzing the problem and, appealing to commonsense and intuition, determining reasonable outcomes of the task required. We use toy examples, which we progressively elaborate, but the approach easily applies to more practical cases. Later, we develop needed systemically logical foundation and machine learning. It should be noted that we assume that passages in natural language have already been translated into a suitable logic form. Let us start from the following:

Example 1

The user's query, Q, is "Is John married?" Available information sources are:
S1: "John went on his first date with Mary."
S2: "John read a book."
We want to determine which source is most relevant to Q.

The query refers to the current state of the world, which with some approximation we can identify with the final state of the world in the sources. The sources describe events that occurred over time. Neither source mentions being married, making syntactic-based methods unfit for the task. However, from an intuitive perspective, S1 is more relevant to Q than S2. In fact, S1, together with commonsense knowledge that married people (normally) do not go on first dates, provides a strong indication that John is not married. S2, on the other hand, provides no information pertaining the query.

In this simple example, one can not only identify S1 as the most relevant source, but also obtain an accurate answer to the question. The simplicity of the example blurs the line between IR and question answering. In general, however, providing an accurate answer requires a substantial amount of reasoning to be carried out once a relevant source has been identified, as well as deep understanding of the content of the source and a large amount of world knowledge—something that is still challenging for state-of-the-art approaches. We focus on defining techniques that provide the reader with a ranking of the sources based on our expectation that answers may be found in them.

To focus on the core IR task, we assume that query and sources have already been translated to a temporally-tagged logical representation. We also assume the availability of suitable knowledge repositories. It should be noted that, while our work is somewhat related to research on temporal relations (e.g., Allen's interval calculus), the two differ because we focus on reasoning about events and their effects, rather than relations between events.

2.1. Preliminaries

The system in this section 2 builds upon action language AL for the representation of knowledge about actions and their effects. The syntax of AL builds upon an alphabet consisting of a set F of symbols for fluents and a set A of symbols for actions. Fluents are boolean properties of the domain, whose truth value may change over time. A fluent literal is a fluent f or its negation ¬f. The statements of AL are:

$$a \text{ causes } l_0 \text{ if } l_1, l_2, \ldots, l_n \qquad \text{EQ. 11}$$

$$l_0 \text{ if } l_1, \ldots, l_n \qquad \text{EQ. 12}$$

$$a \text{ impossible if } l_1, \ldots, l_n \qquad \text{EQ. 13}$$

(11) is a dynamic (causal) law, and intuitively says that, if action a is executed in a state in which literals $l_1, \ldots, l_n$ hold, then $l_0$, the consequence of the law, will hold in the next state. (12) is a state constraint and says that, in any state in which $l_1, \ldots, l_n$ hold, $l_0$ also holds. (13) is an executability condition and says that a cannot be executed if $l_1, \ldots, l_n$ hold. A set of statements of AL is called action description. The semantics of AL maps action descriptions to transition diagrams. A set S of literals is closed under a state constraint (2) if $\{l_1, \ldots, l_n\} \not\subseteq S$ or $l_0 \in S$. S is consistent if, for every $f \in F$, at most one of f, ¬f is in S. It is complete if at least one of f, ¬f is in S. A state of an action description AD is a complete and consistent set of literals closed under the state constraints of AD.

Given an action a and a state σ, the set of (direct) effects of a in σ, denoted by E(a, σ), is the set that contains a literal $l_0$ for every dynamic law (1) such that $\{l_1, \ldots, l_n\} \subseteq \sigma$. Given a set S of extended literals and a set Z of state constraints, the set, CnZ(S), of consequences of S under Z is the smallest set of extended literals that contains S and is closed under Z. Finally, an action a is non-executable in a state σ if there exists an executability condition (3) such that $\{l_1, \ldots, l_n\} \subseteq \sigma$. Otherwise, the action is executable in σ.

The semantics of an action description AD is defined by its transition diagram τ (AD), a directed graph (N, E) such that: N is the collection of all states of AD, and E is the set of all triples $(\sigma, a, \sigma^1)$ where $\sigma, \sigma^1$ are states, a is an action executable in σ, and $\sigma^1$ satisfies the successor state equation $\sigma^1 = Cn_z(E(a, \sigma) \cup (\sigma \cap \sigma^1))$, where Z is the set of all state constraints of AD. Triple $(\sigma, a, \sigma^1)$ is called a transition of τ (AD) and $\sigma^1$ is a successor state of σ (under a). A path in a transition diagram T (A) is a sequence $((\sigma_0, a_0, \sigma_1, a_1, \sigma_2, \ldots, \sigma_n)$ in which every triple $(\sigma_i, a_i, \sigma_{i+1})$ satisfies the successor state equation. We denote the initial state of a path π by $\pi_{\sigma()}$.

Next, we introduce ASP. Let Σ be a signature containing constant, function and predicate symbols. Terms and atoms are formed as in first-order logic. A literal is an atom a or its negation ¬a. A rule is a statement of the form: $h_1, \ldots, h_k \leftarrow l_1, \ldots, l_m,$ not $l_{m+1}, \ldots,$ not $l_n$ where $h_i$'s and $l_i$'s are literals and not is called default negation operator. Its intuitive meaning in terms of a rational agent reasoning about its beliefs is "if you believe $\{l_1, \ldots, l_m\}$ and have no reason to believe $\{l_{m+1}, \ldots, l_n\}$, then you must believe one of $\{h_1, \ldots, h_k\}$." If m=n=0, symbol ← is omitted and the rule is a fact Rules of the form $\bot \leftarrow l_1, \ldots, l_n$ are abbreviated ← $l_1, \ldots,$ not $l_n$, and called constraints, intuitively meaning that $\{l_1, \ldots,$ not $l_n\}$ must not be satisfied. A rule with variables is interpreted as a shorthand for the set of rules obtained by replacing the variables with all possible variable-free terms. A program is a set of rules over Σ. A consistent set S of literals is closed under a rule if $\{h_1, \ldots, h_k\} \cap S \neq \emptyset$ whenever $\{l_1, \ldots, l_m\} \subseteq S$ and $\{l_{m+1}, \ldots, l_n\} \cap S = \emptyset$. Set S is an answer set of a not-free program if S is the minimal set closed under its rules. The reduct, $\Pi^S$, of a program Π w.r.t S is obtained from Π by removing every rule containing an expression "not 1" s.t. 1 S and by removing every other occurrence of not 1. Set S is an answer set of Π if it is the answer set of $Π^S$.

2.2. Problem Analysis

The previous example allows us to provide a first high-level characterization of the task we aim to study, as one in which we are given a query Q and a collection of sources $S_1, \ldots, S_n$, and are asked to produce scores $s_1, \ldots, s_n$ indicating how relevant each source is to the task of finding an answer to Q. If we adopt the convention that 0 is the best possible score and ∞ the worst, then it is conceivable that, in Example 1, $S_1$ should be assigned a score of 0 and $S_2$ a score of ∞ to indicate complete irrelevance.

As in traditional Information Retrieval (IR), the sources may be ranked based on their respective score. Both syntactic and semantic aspects may have to be taken into considerations in determining scores for the documents. Thus, below, we use the term "semantic score" when referring to the score assigned to documents by the techniques herein. It is worth stressing the difference between the task at hand and question answering, where the goal is to produce a definitive answer. At the end of the process we consider here, the answer to Q may still be unknown, but there will be reason to believe that careful study by a human of the sources identified as relevant will lead to such answer.

Next, we consider a number of examples and corresponding expectations. Based on the examples, later we propose a formalization of the reasoning processes. Example 1 showed that the event of going on a first date may lead us to infer that John is not married. But how can one reach such conclusion ? One option is to reason by cases, and consider two possible views of the world: one in which John is married at the beginning of the story, and one in which he is not Commonsense tells us that the action 1 of going on a first date is not executable when married. Hence, the view in which John is initially married is inconsistent with the source. So, we conclude that John must not have been married in the initial state. Given further knowledge that one does not get married on a first date, one can infer that John remains not married after the date. Thus, the source provides evidence that a reader can use to answer the query.

From a technical perspective, the example highlights the importance of being able to reason by cases, to reason about the executability of actions, and to propagate the truth of properties of interest over the duration of the story. Note, however, that reasoning by cases is sometimes misleading. Consider $S_2$ from Example 1: reasoning by cases leads to the same two possible initial states. Since reading does not affect married status, there are two ending states for the story. This might be taken as an indication that the source provides some useful evidence for a reader, but it is clear intuitively that S2 is, in fact, irrelevant. Next, let us consider if, and how, the previous query should match a more complex document. For the sake of this example, let us assume the existence of a fictitious country C, whose laws allow plural marriage.

(From now on, we will use action and event as synonyms.)

Example 2

Q: Is John married?
S: John, who lives in country C, just went on his first date with Mary.

In this case, S does not provide useful information towards answering Q. John is from C, where plural marriage is allowed, and knowledge about plural marriage yields that being married does not preclude a married person from going on a first date. The example also demonstrates the importance of reasoning about default statements (statements that are normally true) and their exceptions. The fact that, normally, married people do not go on first dates is an instance of a default statement, and an inhabitant of C constitutes an exception to it Similarly to S2 from the previous example, reasoning by cases may be somewhat misleading, as it may suggest that the source provides some evidence useful to answering the question. Rather than reasoning by cases, it appears to be more appropriate to state that whether John is initially married is unknown. The lack of knowledge is propagated to the final state, given that going on a date has no effect on it in the present context The source is thus irrelevant and should receive a semantic score of ∞. Note the striking difference in scores between S1 from the previous example and the current source: it appears that in some cases reasoning by cases is useful, while in others reasoning explicitly about lack of knowledge is more appropriate. In the next section, we provide a characterization of reasoning matching this intuition. Next, we investigate the role of the effects of actions.

Example 3

Q: Is John married?
S: John, who lives in country C, recently went on his first date with Mary. A week later, they tied the knot in Las Vegas.

Obviously, a first indication of relevance can be obtained with shallow reasoning and syntactic matching: "tying the knot" is a synonym of "getting married" and "getting married" and "being married" share enough similarities to make a match likely. However, we are interested in more sophisticated reasoning. In the initial state, John may or may not be married due to his country's laws. Similarly to Example 1, John's married status persists in the state following the first date. Tying the knot, however, has the effect of making John married in the resulting state. Hence, S is indeed relevant to Q. Intuitively, its semantic score should be equal to that of S1 from Example 1. This demonstrates the importance of keeping track of the changes in the truth of the relevant properties over time. The next example takes this argument one step further.

Example 4

Q: Is John married?
S: John recently went on his first date with Mary. A week later, they tied the knot in Las Vegas. A month later, they filed for divorce.

Here, we assume that filing for divorce does not immediately cause the spouses to be divorced. For simplicity of presentation, we adopt a view in which filing for divorce has a non-deterministic effect: in the resulting state, it is equally likely for the spouses to be married or not The relevance of S to Q is not as straightforward as in some of the previous cases. It is indeed true that, at the end of the story, it is unknown whether John is married. On the other hand, the story still provides some information pertaining to John's married status—certainly, more than source S2 ("John read a book") from Example 1 or the source from Example 2 ("John, who lives in country C, just went on his first date with Mary.").

One way to make a distinction between the two cases is to consider that, if S from Example 4 is provided to a reader, and the reader manages to determine whether the filing action succeeded (e.g., by gathering additional evidence), S will immediately allow the reader to answer Q. Differently from the previous examples, knowing that filing occurred is essential to allowing a reader to answer the question. In conclusion, while S is not as relevant to Q as other sources we have considered, it is still somewhat relevant This will have to be reflected in the score assigned to the source, which should be higher than the 0 assigned to S1, but obviously smaller than ∞ because the source is indeed relevant. Next, we propose a formalization that captures the behaviors described.

2.3. Formalization of the Reasoning Task

Our formalization leverages techniques from the research on reasoning about actions and change, and specifically action language AL, approximated representations, and evidence-based reasoning. These techniques rely on a graph-based representation of the evolution of the state of the world over time in response to the occurrence of actions. We adopt and expand this approach. Specifically, the system's formalization enables reasoning explicitly about lack of knowledge. Differently from it, however, we allow a reasoner to reason by cases whenever needed. This is applied to knowledge about both initial state and effects of actions. Our approach also leverages evidence-based reasoning to rule out some of the cases considered. Finally, we adopt AL as the underlying formalism, but expand it for an explicit characterization of non-deterministic effects and we allow hypothesizing about exceptional/atypical circumstances, eventually linking them to the relevance of sources. Differently from AL, our language is defined so that, in the presence of actions with non-deterministic effects, it is possible to reason both by cases, and by explicitly characterizing lack of knowledge. The syntax of the resulting language, which we call ALIR, is described next by building on that of AL, followed by its semantics.

In ALIR, we identify a (possibly empty) subset D of F called the set of default fluents. Default fluents are assumed false at the beginning of a sequence of events. Additionally, an extended (fluent) literal is either a fluent literal or the expression u (f), intuitively meaning that it is unknown whether f is true or false. Expression u(f) is called proper extended literal. The syntax of dynamic law (1) is extended to allow $l_0$ to be an proper extended literal. If $l_0$ is a proper extended literal u(f), the law intuitively states that the action affects the truth of f non-deterministically. The action of filing for divorce from Example 4 might be modeled with a dynamic law that has u(married) as its consequence.

The semantics of ALIR is obtained by extending the definitions to extended literals as needed.

Specifically, a set S of extended literals is consistent if, for every f∈F, at most one of f, ¬f, u (f) is in S. It is complete if at least one of f, ¬f, u(f) is in S. A state of an action description AD of ALIR is a complete and consistent set of extended literals closed under the state constraints of AD.

In this phase of the investigation, we restrict our attention to cases in which every action has at most a single direct non-deterministic effect, and we disallow concurrent actions. The direct effects of actions are extended as follows. Given an action a and a state σ, the set of combined (direct) effects of a in σ, denoted by $E(aa^?, σ)$, coincides with E(a, σ) from AL. The set of positive effects of a in σ, $E(a^+, σ)$, is the set that contains: (a) a fluent literal l for every dynamic law (1) such that $l_0$=l and $\{l_1, \ldots, l_n\} \subseteq σ$, and (b) a fluent f for every dynamic law such that $l_0$=u(f) and $\{l_1, \ldots, l_n\} \subseteq σ$. Similarly, the set of negative effects of a in σ, $E(a^-, σ)$, is the set that contains: (a) a fluent literal l for every dynamic law such that $l_0$=l and $\{l_1, \ldots, l_n\} \subseteq σ$, and (b) a fluent literal ¬f for every dynamic law such that $l_0$=u(f) and $\{l_1, \ldots, l_n\} \subseteq σ$.

Given an action description AD, the edges of the corresponding transition diagram are given by all triples (σ, a∘, σ') where σ, $σ_1$ are states, a is an action executable in σ, ∘ is one of ?, +, −, and $σ_1$ satisfies the equation:

$$σ^1 = Cn_z(E(a^∘, σ) \cup (σ \cap σ^1))$$   EQ. 15

When multiple successor states exist for a given σ and a∘, the action description is called nondeterministic.

A dynamic law with a proper extended literal u(f) as its consequence has two deterministic counterparts, obtained by replacing its consequence by f and ¬f respectively. A dynamic law with a fluent literal as its consequence has a single deterministic counterpart, which coincides with the law itself. An action description AD has emergent non-deterministic behavior if there exists a non-deterministic action description AD1, obtained from AD by replacing every dynamic law by one of its deterministic counterparts. In the current phase of the investigation, we do not consider action descriptions with emergent non-deterministic behavior.

Next, we turn our attention to the use of transition diagrams to reason about sequences of actions and to determine the relevance of available sources.

2.4 Reasoning about Relevance of Sources

In our approach, a qualified action sequence is a tuple $s=\langle a_0/q_0, a_1/q_1, \ldots, a_k/q_k \rangle$ where $a_i$'s are actions and each $q_i$ is one of ?, ×. Intuitively, qualifier ? specifies that the combined effects of the action should be considered, while × indicates that reasoning by cases should be used. The length of s is k+1. The degree of s, denoted by |s|, is the number of expressions of the form ai/× in s. If $\aleph = \langle a_0, a_1, \ldots, a_k \rangle$ is a sequence of actions, we say that $s=\langle a_0/q_0, a_1/q_1, \ldots a_k/q_k \rangle$ extends $\aleph$ for every possible choice of qualifiers. $\aleph$? denotes the extension of $\aleph$ where all qualifiers are ? and $\aleph$× denotes the extension where all qualifiers are ×. Let σ be a state and s be a qualified action sequence. A path $π=\langle σ_0, α_0, σ_1, \ldots, α_k, σ_{k+1} \rangle$ is a model of σ, s if all of the following hold: (a) $σ_0=σ$, (b) if $q_i=?$, then $α_i=a_i^?$, (c) if qi=×, then $α_i=a_i^+$ or $α_i=a_i^-$.

Given a set Σ of states and a qualified action sequence s, a path π is a model of Σ, s if π is a model of σ, s for some σ∈Σ. To illustrate these notions, consider an action description {a1 causes ¬g if g; a2 causes u(f) if ¬g}. Let σ be {¬f, g}. It is not difficult to see that the pair σ, $\langle a_1/?, a_2/? \rangle$ has a unique model, h{¬f, g}, $a_1^?$, {¬f, ¬g}, $a_2^?$, {u(f), ¬g}i. On the other hand, σ, $\langle a_1/?, a_2/× \rangle$ has two models, h{¬f, g}, $a_1^?$, {¬f, ¬g}, $a_2^+$, {f, ¬g}i and {¬f, g}, $a_1^?$, {¬f, ¬g}, $a_2^-$, {¬f, ¬g}i. The degrees of the two qualified action sequences are 0 and 1 respectively.

Let us now consider cases in which knowledge about the initial state is incomplete. Intuitively, if the truth value of f is unknown, one may assume that f is false if it is a default fluent and that u(f) holds otherwise. However, as highlighted in the above examples, it is sometimes necessary to consider other options for certain fluents. This intuition is captured by the notion of forcing of a fluent Given a consistent set I of extended literals and a fluent f, I[f] denotes the set I defined as follows, called the forcing of f in I: if f∈D and $\{\neg f, u(f)\} \cap I = \emptyset$, then $I = \{I \cup \{f\}\}$; if f∉D and $\{f, \neg f, u(f)\} \cap I = \emptyset$, then $I = \{I \cup \{f\}, I \cup \{\neg f\}\}$; otherwise, $I = \{I\}$. For sets of fluents, the forcing of $\{f_1, \ldots, f_m\}$ in I, written $I[\{f_1, \ldots, f_m\}]$, is defined as follows: (a) if m=1, then $I[\{f_1\}] = I[f_1]$; (b) if m>1, then $I[\{f_1, \ldots, f_m\}] = \{I'[f\ m]|I' \in I[\{f_1, \ldots, f_{m-1}\}]\}$.

(Action description $\{q$ if $\neg r, p; r$ if $\neg q, p;$ a causes $p\}$ has an emergent non-deterministic behavior.)

As an example, let us apply these definitions to S1 from Example 1, "John went on his first date with Mary." Assume that the translation from natural language yields Q=m, F={m, ab}, D={ab}, I=∅ and ℵ=(d). Let us also assume that the action description, AD, is {impossible d if m, ¬ab}.4 Note the use of default fluent ab to formalize the fact that the action is normally impossible if one is married. It is not difficult to see that I [F\D]=I[{m, ab}\{ab}] is {{m}, {¬m}}, indicating that, in the initial state, we can assume that he may or may not have been married.

Let Z be the set of state constraints of AD. The default closure of I is the set $\delta(I) = C_{nZ}(I \cup \{\neg f | f \in D \wedge f \notin I\})$. If $\delta(I)$ is consistent, we say that the completion of I is the set of extended literals $\gamma(I) = \delta(I) \cup \{u(f) | f \notin \delta(I) \wedge \neg f \notin \delta(I)\}$. Note that $\gamma(I)$ may not exist, as in the case of I={p, q} and of AD={¬q if p}. If $\gamma(I)$ exists, it is complete, consistent and includes I. Given a set F of fluents, the completion of I w.r.t F is the set $\gamma(I, F) = \{\gamma(I') | I' \in I | F | \wedge \gamma(I') \text{ exists}\}$. The degree of $\gamma(I, F)$, denoted by $|\gamma(I, F)|$, is $|F|$.

Going back to Example 1, applying the closure to each element of I[F\D] yields, respectively, {m, ¬ab} and {¬m, ¬ab}, which can intuitively be viewed as the initial states that are consistent with assumptions made about m.

As demonstrated by Example 1, there are cases in which the truth of certain fluents in the initial state can be inferred indirectly from the source. The following definition of $\rho(I, \aleph)$ captures this idea. Given a consistent set I of extended fluent literals and a sequence of actions ℵ:

$$\rho(I, \aleph) = \bigcap_{I' \in I[F\setminus D]} \{I' \mid \gamma(I'), \aleph^x \text{ has a model}\} \quad \text{EQ. 16}$$

(We use abbreviations to save space. Fluents: m—John is married; ab—John is an exception w.r.t going on first dates when married. Actions: d—going on a first date; r—reading a book. In practice, variables may be introduced to increase generality.)

Note that $\rho(I, \aleph)$ may not exist, e.g., if $\gamma(I1)$ does not exist for any element of I[F\D]. If $\rho(I, \aleph)$ does not exist, then the source is irrelevant and its semantic score if ∞. If, instead, $\rho(I, \aleph)$ exists, it is not difficult to see that $I \subseteq \rho(I, \aleph)$.

Let us see how $\rho(I, \aleph)$ is calculated in Example 1. The first step consists in checking for models of $\gamma(I1)$, $\aleph^x$. Clearly, {m, ¬ab}, (d) has no model, because d is not executable. On the other hand, {¬m, ¬b}, (d) has a model. Hence, $\rho(I, \aleph)$ is the intersection of the only set {¬m}, resulting in $\rho(I, \aleph) = \{\neg m\}$. Intuitively, this mirrors the intuition that John is not married in the initial state.

We are now ready to introduce the notion of entailment and to use it to determine whether there is a match between Q and S. A path $\pi = ((\sigma_0 \alpha_0, \sigma_1, \ldots, \alpha_{k-1}, \sigma_k)$ entails a fluent literal l (written $\pi | = l$) if $l \in \sigma_k$. Given a fluent f, we say that $\pi$ entails ±f (written $\pi | = \pm f$) if $\pi | = f$ or $\pi | = \neg f$.

For simplicity, we assume Q to be a fluent Let I be a set of fluent literals explicitly stated to hold in the initial state by S and let $\aleph = (a_0, a_1, \ldots, a_k)$ be the sequence of actions from S. We say that S is a match for Q if there exist a set F of fluents and a qualified action sequence s extending ℵ s.t:

c1 $\pi$ entails ±Q for some model $\pi$ of $\gamma(\rho(I, \aleph), F)$, s, and c2 for every model $\pi'$ of $\gamma(\pi_{\infty}\backslash \rho(I, \aleph), \emptyset), <>$, one of the following holds: (a) $\pi' | \neq \pm Q$, or (b)$\pi 1 | = \neg Q$ and $\pi' = Q$, or (c) $\pi' | = Q$ and $\pi | = \neg Q$.

The first condition checks whether the document is relevant to the query —possibly under some assumptions about the default fluents—while the second condition ensures that such assumptions are not directly and solely responsible for the fact that the document is relevant.

The semantic score of S is the smallest value of $|\gamma(\rho(I, \aleph), F)| + |s|$ for all possible choices of F and s satisfying the above items. If no F and s were found to satisfy the above conditions, then S is not a match for Q (i.e., it is irrelevant to the query) and its semantic score is ∞.

In reference to Example 1, let us first look for F, s, satisfying (c1). Let us begin with F=∅, s=<d>?, which have a degree of 0. It is not difficult to see that $\gamma(\rho(I, \aleph), F) = \gamma(\{\neg m\}, \emptyset)) = \{\{\neg m, \neg ab\}\}$ and that $\{\{\neg m, \neg ab\}\}$, d? has a unique model $\pi = (\{\neg m, \neg ab\}, d^?, \{\neg m, \neg ab\})$. Thus, the model entails ±Q, which means that condition (c1) for establishing a match is satisfied.

Next, we check condition (c2). Clearly, $\gamma(\pi_{\infty}\backslash \rho(I, \aleph), \emptyset) = \{\{u(m), \neg ab\}\}$. $\{\{u(m), \neg ab\}\}, <>$ has a unique model, $(\{u(m), \neg ab\})$, and it does not entail ±Q. Intuitively, this means that the assumption made about the initial state is not directly responsible for the ability to entail the query in (c1).

Hence, S matches Q. Additionally, because F=∅, s=d? yield a score of 0, the semantic score of the document is 0.

The next possible options, with a combined degree of 1, are F=∅, s=<r>$^x$ and F={m}, s=(r)?. In the first case, there are two models, e.g., $\pi = (\{u(m), \neg ab\}, r^+, \{u(m), \neg ab\})$, but neither entails ±Q. The second case is more interesting. Clearly, there are two models of $\gamma(\rho(I, \aleph), F), s = \gamma(\emptyset, \{m\})$, (r)?: $\pi = (\{m, \neg ab\}, r?, \{m, \neg ab\})$ and $\pi = (\{\neg m, \neg ab\}, r?, \{\neg m, \neg ab\})$, and $\pi | = Q$, while $\pi 1 | = \neg Q$. Hence, we need to check condition (c2) for each. For the former, $\gamma(\pi \sigma 0 \backslash \emptyset, \emptyset) = \{\{m, \neg ab\}\}$, and $\{\{m, \neg ab\}\}, <>$ has a unique model $(\{m, \neg ab\})$, which entails Q. Thus, the condition is not satisfied. For $\pi^1$, we obtain a unique model $(\{\neg m, \neg ab\})$, which entails ¬Q, failing to satisfy the condition as well. Therefore, none of these choices for F and s yields a match. Similar conclusions can be drawn for the other choices for F and s. Hence, S2 does not match Q and receives a semantic score of ∞. The other examples are solved similarly. The details are omitted to save space, but we provide highlights of some of them.

Example 2. Contrast the previous case with Example 2. People from countries that allow plural marriage are exceptions to the custom about first dates, and thus I={ab}, ℵ=(d), and I[F\D]={{m, ab}, {¬m, ab}}. Differently from the previous case, both sets of I[F\D] yield a model, since ab makes the executability condition inapplicable. Hence, $\rho(I, \aleph) = \{ab\}$. Selecting F=∅, s=(d)? yields a unique model $(\{u(m), ab\}, d^?, \{u(m), ab\}) | \neq \pm Q$. Selecting F={m}, s= d' yields two models entailing Q and ¬Q respectively, but the same are entailed by $\gamma(\pi_{\infty}\backslash\rho(I, \aleph), \emptyset), <>$, thus failing condition (c2). Similar reasoning applies to the other cases. Because no F, s could be identified, the semantic score of S is ∞, indicating that it is irrelevant to Q. Note the key role played by condition (c2) in this example: without it, the source would have been deemed relevant to the query.

Example 4. Consider Example 4, where the action description is expanded with {w causes m; fd causes u(m)} and relevant executability conditions. We have I=∅, $\aleph$=(d, w, fd), and, similarly to Example 1, $\rho(I, \aleph)=\{\neg m\}$. The model obtained from F=∅, s=$\aleph^?$ does not entail ±Q. On the other hand, F=∅, s=(d/?, w/?, fd/×), yield two models, entailing Q and ¬Q resp., depending on the outcome of fd. This time, condition (c2) is satisfied, since, in both cases, $\gamma(\pi_{\infty}\backslash\rho(I, \aleph), \emptyset)=\{\{u(m), \neg ab\}\}$ and $\{\{u(m), \neg ab\}\}$, 0 does not entail ±Q. In conclusion, S indeed matches Q, and the source has semantic score |∅|+|(d/? w/?, fd /×)|=1. As expected, its semantic score is worse than that of, e.g., $S_1$, while obviously better than that of, e.g., $S_2$.

2.5 Automating the Reasoning Task

Next, we automate the reasoning task discussed earlier by means of a translation of ALIR to ASP. Given a set I of extended fluent literals, a set F of fluents, a qualified action sequence s, and an action description AD, the encoding of $AL_{IR}$ is program $\Pi_{AD}$ (I, F, s), described next In the following, I ranges over steps in the evolution of the domain; given fluent literal l, $\chi(l, I)$ stands for holds (f, I) if l=f and ¬holds(f, I) if l=¬f. For every action a, the translation includes a rule pos(a, I) $\lor$ neg(a, I)←occurs (a, I), split(a, I). The translation of a dynamic law (1) depends on the form of $l_0$. If $l_0$ is a fluent literal, translation is: $\chi(l_0, I+1)$←occurs (a, I), $\chi(l_1, I), \ldots, \chi(l_n, I)$. If $l_0$ is of the form u(f), the translation of the law is:

u(f, I+1)←occurs(a, I), $\chi(l_1, I), \ldots, \chi(l_n,I)$, not split (a, I).

$\chi$(f, I+1)←pos(a, I), $\chi(l_1, I), \ldots, \chi(l_n, I)$.

$\chi$(¬f, I+1)←neg(a, I), $\chi(l_1, I), \ldots, \chi(l_n, I)$.  EQs. 17, 18, 19

Expression occurs (a, I) states that action a occurs at step I in the story; split(a, I) states that reasoning by cases should be applied to the outcomes of that occurrence of a. A state constraint (2) is translated as an ASP rule of the form holds $(l_0, I)$←holds $(l_1, I), \ldots,$ holds$(l_n, I)$. Executability condition (3) is translated as a rule←occurs(a, I), $\chi(l_1, I), \ldots, \chi(l_n, I)$. The translation of an action description is completed by the inertia axioms, which are expanded in ALIR to accommodate extended literals (F is a variable ranging over all fluents):

$\chi$(F, I+1)←$\chi$(F, I), not $\chi$(¬F, I+1), not u(F, I+1).

$\chi$(¬F, I+1)←$\chi$(¬F, I), not $\chi$(F, I+1), not u(F, I+1).

u(F, I+1)←u(F,I), not $\chi$(F, I+1), not $\chi$(¬F, I+1).  EQs. 20, 21, 22

The next axioms define the completion of the initial state:

[$g_1$] $\chi$(F,0)←init(F), $\chi$(¬F, 0)←¬init(F). [$g_1$]

[$g_2$] $\chi$(F,0)←forced(F), default(F), not ¬init(F), $\chi$(F, 0)$\lor\chi$(¬F, 0)←forced(F), not default(F), not init(F), not ¬init(F),

[$g_3$] $\chi$(¬F, 0)←default(F), not $\chi$(F, 0), u(F, 0)←not default(F), not $\chi$(F, 0), not $\chi$(¬F, 0).  EQs. 23, 24, 25

Above, statement default (f), included as fact for every f∈D, states that f is a default fluent. init(f) (resp., ¬init (f)) says that f is initially true (resp., false). forced(f) states that f is part of a forcing. Rules [g1] map the knowledge about the initial state to statements holds(•, •). [$g_2$] formalizes to the notion of forcing. [$g_3$] defines the completion.

The next step of the definition of $\Pi_{AD}$ (I, F, s) is the encoding of its arguments. For every f∈I (resp., ¬f∈I), $\Pi_{AD}$ (I, F, s) includes a fact init (f) (resp., ¬init (f)). For every f∈F, $\Pi_{AD}$ (I, F, s) includes a fact forced(f). Qualified action sequence s is encoded by a set of facts of the form occurs (a, i) and split(a, i), where a are actions from s and i are their indexes. Specifically, $a^?$ is translated as a statement occurs (a, i), where i is the index in the sequence, while $a^\times$ is translated as two facts, occurs(a, i), split(a, i).

This completes the definition of $\Pi_{AD}$ (I, F, s). Next, we link its answer sets to the models of $\gamma$(I, F), s. We say that an answer set A encodes a path π if: (a) for every fluent literal l, l∈$\sigma_i$ iff $\chi$(l, i) ∈A; (b) for every fluent f, u(f)∈$\sigma_i$ iff u(f, i) ∈A; (c) for every action a, $\alpha_i=a^?$ iff occurs (a,i) ∈A and split(a, i) ∈A; (d) for every action a, $\alpha_i=a^+$iff {occurs (a, i), split(a, i), pos(a, i)} ⊆A; (e) for every action $a_i$ αi=a–iff {occurs(a, i), split(a, i), neg(a, i)} ⊆A. The link is established by:

Proposition 1

Let I be a consistent set of fluent literals, F be a set of fluents, and s be a qualified action sequence. A path π is a model of $\gamma$(I, F), s if there exists an answer set of $\Pi_{AD}$(I, F, s) that encodes π.

Corollary 1

A model π of $\gamma$(I, F), s that entails l exists if there exists an answer set A of $\Pi_{AD}$(I, F, s) such that $\chi$(l, k) ∈A, where k is the length of s. Also, for every fluent f, π|=±f iff {$\chi$(f, k), $\chi$(¬f, k)} ∩A/=∅.

These results motivate the algorithm in FIG. 2. Let ||A|| be the number of atoms of A formed by relations forced and split. The behavior of the algorithm is characterized by Theorem 1: If S is a fluent, then S is a match for Q iff FindMatch(I,$\aleph$,Q)≠⊥. The rank of S is ||FindMateh(I,$\aleph$, Q)||.

Inputs to the algorithm:

*I: the set of all fluent literals for which a truth value is known.

*Q, F, $\aleph$, AD: as described in the paper(s)

DESCRIPTION OF THE ALGORITHM

Step 1 infers which fluent literals are necessarily true or false based on indirect inference on the information provided. This is accomplished by calculating $\rho(I, \aleph)$. Specifically, it considers all possible ways of expanding I by making assumptions about the truth value of non-default fluents from I. Among those, it selects the expansions that are compatible with the actions in $\aleph$. Finally, through an intersection operation it finds the fluent literals common to all such expansions and assigns such set to variable R.

Step 2 detects cases in which $\rho(I, \aleph)$ does not exist and returns ⊥ to indicate this condition.

Steps 3-7 iteratively consider candidate solutions (F, s), where F is a set of fluents and s is an extension of $\aleph$, for increasing values of |F|+|s|, i.e. the number of elements in F and the branching degree of s.

For each candidate solution (F, s), Step 4 checks whether conditions (cl) and (c2) of the definition of the notion "S is a match for Q" hold. Specifically, the step begins by verifying whether the document is relevant to the query (condition (c1) of the definition of match for Q). To do so, every answer set A that encodes a model of γ(I,F), s is considered in turn. Answer sets that do not provide a truth value for the query Q are discarded. For each remaining answer set A, Step 4a collects the set X of all fluent literals whose truth value in the initial state had not been already inferred at Step 1.

Step 4b checks condition (c2), i.e. ensures that any assumptions made by the earlier parts of Step 4 are not directly and solely responsible for the fact that the document is relevant This is accomplished by considering every answer set, B, corresponding to every model of γ(X,∅) under an empty sequence of actions. For the path encoded by every such answer set B, Step 4b checks if the query Q was assumed to be true (or false) in the initial state and carried to the final state of the path with that truth value by inertia. If this is never the case for any B, then the source has been identified, and Step 4c terminates the execution of the algorithm.

Otherwise, Step 5 finds a new candidate solution (F', s') that has not yet been considered and that is the smallest among all candidate solutions that are left to be considered.

Step 6 sets (F',s') as the current candidate solution and loops back to Step 4.

Proof (sketch). Using the two previous results, the thesis is easily obtained by observing that step 1 implements the calculation of ρ(I, ℵ), and that steps 4 and 4b check, respectively, conditions (c1) and (c2).

Let us trace the key parts of the algorithm with $S_1$ from Example 1. Clearly, $\Pi_{AD}$(I, F\D, ℵ ⊇{←occurs(d, I), holds (m, I), step(I), forced(m), occurs(d, 0).}. Step 1 infers the initial truth of fluents indirectly from $S_1$, resulting in an answer set containing {¬holds(m, 0), forced(m)}, i.e., John cannot be initially married. Hence, $I_1$=I∪{¬m}. Step 4 checks condition (c1). It results in a unique answer set A ⊇ {holds(m, 0), ¬holds(ab, 0), occurs(d, 0), ¬holds(m, 1), ¬holds(ab, 1)}, indicating that ({¬m, ¬ab}, d', {¬m, ¬ab}) entails ±m. Step 4b checks condition (c2). There is a single answer set B⊇{u(m, 0), ¬holds(ab, 0), u(m, 1), ¬holds(ab, 1)}, and, clearly, {holds(m, 0), ¬holds(m, 0)}∩B=∅. Hence, (c2) is satisfied and the algorithm returns A. The rank of $S_1$ is ||A||=0.

3. Applications

The IR system and method herein may be used in search engine optimization within a wired or wireless network connecting nodes on a network of CPUs and storage devices to help identify better answers to queries, but also in data mining, cybersecurity, healthcare, and business analytics. In each of these areas, the system and method herein may define a useful IR approach that can accurately answer queries about events as well as about the state of the world before, during, and after the events described in the available sources.

As an overview of the user-process, a user of a computing device (or a client process) may submit a natural language or other query, which may contain words or phrases. The query is submitted to the system described herein. The system searches its corpus of information (database records, documents, web pages, APIs to information systems, etc.), and returns what is considered the most relevant results.

Consider an example related to data mining and healthcare: a radiologist might be looking for information on whether a patient was ever bedridden for a period of time. A document reporting that the patient suffered a multiple fracture at his left leg should be returned as relevant, given that the patient was (likely) bedridden as a result of the injury. By linking the event of suffering a leg injury and the resulting state of the patient, action-centered IR will enable the identification of such a match. Similar considerations can be made for business analytics. An example is related to the role of descriptive analytics in making retail markdown decisions, where a manager typically wants to examine historical data for similar products regarding prices, units sold, advertising, etc. That is, the manager is interested in understanding the state of the world (e.g., prices and sales) before and after previous markdown events—which is exactly what action-centered IR is designed for. Finally, in cybersecurity, consider the case of a user asking whether a computer was without network connectivity during a certain timeframe. A system log stating that the router, to which the computer is connected, was restarted during that period of time, is indeed a match for the query. However, detecting the match requires an IR technique, such as action-centered IR, capable of observing that a router restart causes a transition to a state in which all connected devices are without connectivity.

While the invention has been described with reference to the embodiments above, a person of ordinary skill in the art would understand that various changes or modifications may be made thereto without departing from the scope of the claims.

The invention claimed is:

1. A computer-implemented method of information retrieval (IR), the method to be performed by a network of processors and, comprising:
    receiving a query;
    in response to receiving the query, formalizing event based IR;
    identifying, using the event based IR, sources of information that are relevant to the query, wherein the event based IR includes at least semantic-level matching in the presence of sequences of events in the query, and wherein the sources of information at least comprise database records and webpages;
    verifying, using the event-based IR, that the relevance of the identified sources of information is correct; and
    providing, using the event based IR, the verified sources of information in order of potential relevance to the query.

2. The computer-implemented method of claim 1, wherein the event based IR provides sources of information relevant to events that occur after a time relevant to the query.

3. The computer-implemented method of claim 2, wherein the event based IR comprises techniques including: Reasoning about Actions and Change (RAC), action language, approximation-based formalization, and evidence based reasoning techniques.

4. The computer-implemented method of claim 1, wherein the identifying step is performed using a sequence of FindMatch (I, ℵ, Q) steps, wherein in response to an input I, wherein I includes fluent literal explicitly stated to hold in an initial state by S; ℵ is a sequence of actions from S, and Q is a fluent; the FindMatch (I,ℵ, Q) outputs an answer set encoding a path if a match to the query exists.

5. The computer-implemented method of claim 4, wherein if S is a fluent, then S is a match for Q iff FindMatch(I,ℵ,Q)≠⊥, and a rank of S is ||FindMatch (I,ℵ,Q)||.

6. The computer-implemented method of claim 4, wherein the FindMatch (I, ℵ, Q) steps include the following:

1. Let R be the intersection of all answer sets of $\Pi_{AD}(I,F\backslash D, \aleph^s)$ and I' be I ∪ {l| {χ(l, 0), forced(f)} ⊆ R ∧ (l = f ∨ l = ¬f)};
2. If $\Pi_{AD}(I,F\backslash D, \aleph^s)$ has no answer set, retain ⊥ and terminate;
3. Initialize F := ∅ and s := ϰ?;
4. For every answer set A of $\Pi_{AD}(I', F, s)$ such that (χ(Q, k + 1), χ(¬Q, k + 1)} ∩ A ≠ ∅
   (a) Let X = {f | holds(f, 0) ∈ A ∧ f ∉ I'} ∪ {¬f | ¬holds(f, 0) ∈ A ∧ ¬f ∉ I'};
   (b) For every answer set B of $\Pi_{AD}(X, ∅, ( ))$, check that {χ(Q, 0), χ(¬Q, 0)} ∩ B = ∅ or χ(Q, 0) ∈ B ∧ χ(¬Q, k + 1) ∈ A, or χ(¬Q, 0) ∈ B ∧ χ(Q, k + 1) ∈ A;
   (c) If every B satisfies the condition, then return A and terminate;
5. Select a set F' of fluents and an extension s' of ϰ such that:
   (a) the pair F', s' has not yet been considered by the algorithm, and
   (b) |F'| + |s'| is minimal among such pairs;
6. If no such pair F', s' exists, then return ⊥ and terminate;
7. F := F'; s := s'; c Repeat from step 4.

7. The computer-implemented method of claim 1, wherein the query and the sources of information are in a temporally-tagged logical representation form.

8. The computer-implemented method of claim 1, wherein the step of formalizing the event based IR is based at least in part on at least one action language which is a representation of information on actions and their effects corresponding to the event based IR.

9. The computer-implemented method of claim 8, further comprising automating the event based IR by translating from the at least one action language to at least one answer set corresponding to the query.

10. A system for information retrieval (IR), the system being operable to:
   receive a query;
   in response to the reception of the query, formalize event based IR;
   identify, using the event based IR, sources of information that are relevant to the query, wherein the event based IR includes at least semantic-level matching in the presence of sequences of events in the query, and wherein the sources of information at least comprise database records and webpages;
   verify, using the event-based IR, that the relevance of the identified sources of information is correct; and
   provide, using the event based IR, the verified sources of information in order of potential relevance to the query.

11. The system of claim 10, wherein the event based IR provides sources of information relevant to events that occur after a time relevant to the query.

12. The system of claim 11, wherein the event based IR comprises techniques including: Reasoning about Actions and Change (RAC), action language, approximation-based formalization, and evidence based reasoning techniques.

13. The system of claim 10, wherein the identification is performed using a sequence of FindMatch (I, ℵ, Q) steps, wherein in response to an input I, wherein I includes fluent literal explicitly stated to hold in an initial state by S; ℵ is a sequence of actions from S, and Q is a fluent; the FindMatch (I, ℵ, Q) outputs an answer set encoding a path if a match to the query exists.

14. The system of claim 13, wherein if S is a fluent, then S is a match for Q iff FindMatch(I,ℵ,Q)≠⊥, and a rank of S is ||FindMatch(I,ℵ,Q) ||.

15. The system of claim 13, wherein the FindMatch (I, ℵ, Q) steps include the following:

1. Let R be the intersection of all answer sets of $\Pi_{AD}(I,F\backslash D, \aleph^s)$ and I' be I ∪ {l| {χ(l, 0), forced(f)} ⊆ R ∧ (l = f ∨ l = ¬f)};
2. If $\Pi_{AD}(I,F\backslash D, \aleph^s)$ has no answer set, retain ⊥ and terminate.
3. Initialize F := ∅ and s: = ϰ?;
4. For every answer set A of $\Pi_{AD}(I', F, s)$ such that (χ(Q, k + 1), χ(¬Q, k + 1)} ∩ A ≠ ∅
   (a) Let X = {f | holds(f, 0) ∈ A ∧ f ∉ I'} ∪ {¬f | ¬holds(f, 0) ∈ A ∧ ¬f ∉ I'};
   (b) For every answer set B of $\Pi_{AD}(X, ∅, ( ))$, check that {χ(Q, 0), χ(¬Q, 0)} ∩ B = ∅ or χ(Q, 0) ∈ B ∧ χ(¬Q, k + 1) ∈ A, or χ(¬Q, 0) ∈ B ∧ χ(Q, k + 1) ∈ A;
   (c) If every B satisfies the condition, then return A and terminate;
5. Select a set F' of fluents and an extension s' of ϰ such that:
   (a) the pair F', s' has not yet been considered by the algorithm, and
   (b) |F'| + |s'| is minimal among such pairs;
6. If no such pair F', s' exists, then return ⊥ and terminate;
7. F := F'; s := s'; Repeat from step 4.

16. The system of claim 10, wherein the query and the sources of information are in a temporally-tagged logical representation form.

* * * * *